US012416069B2

(12) United States Patent
Henderson et al.

(10) Patent No.: US 12,416,069 B2
(45) Date of Patent: Sep. 16, 2025

(54) THERMOMECHANICALLY PROCESSED, NANOSTRUCTURE ALUMINUM-RARE EARTH ELEMENT ALLOYS

(71) Applicants: Lawrence Livermore National Security, LLC, Livermore, CA (US); Eck Industries, Inc., Manitowoc, WI (US); Iowa State University Research Foundation, Inc., Ames, IA (US); University of Tennessee Research Foundation, Knoxville, TN (US)

(72) Inventors: Hunter Bryant Henderson, Livermore, CA (US); David Weiss, Manitowoc, WI (US); Ryan T. Ott, Ames, IA (US); Orlando Rios, Knoxville, TN (US)

(73) Assignees: Lawrence Livermore National Security, LLC, Livermore, CA (US); Eck Industries, Inc., Manitowoc, WI (US); Iowa State University Research Foundation, Inc., Ames, IA (US); University of Tennessee Research Foundation, Knoxville, TN (US)

(*) Notice: Subject to any disclaimer, the term of this patent is extended or adjusted under 35 U.S.C. 154(b) by 409 days.

(21) Appl. No.: 17/335,274

(22) Filed: Jun. 1, 2021

(65) Prior Publication Data
US 2022/0380870 A1    Dec. 1, 2022

(51) Int. Cl.
*C22C 21/10*    (2006.01)
*B22F 1/05*    (2022.01)

(52) U.S. Cl.
CPC ............... *C22C 21/10* (2013.01); *B22F 1/05* (2022.01); *B22F 2301/052* (2013.01)

(58) Field of Classification Search
CPC ............................ B22F 1/05; B22F 2301/052
See application file for complete search history.

(56) References Cited

U.S. PATENT DOCUMENTS 5,532,069 A * 7/1996 Masumoto ............ C22C 1/0491
428/548
5,578,144 A * 11/1996 Satou ...................... C22C 45/08
148/438

(Continued)

FOREIGN PATENT DOCUMENTS

CN    103667822 A    3/2014

OTHER PUBLICATIONS

Sims et al., Cerium-Based, Intermetallic-Strengthened Aluminum Casting Alloy: High-Volume Co-product Development, JOM, vol. 68, No. 7, 2016, pp. 1940-1947. (Year: 2016).*

(Continued)

*Primary Examiner* — John A Hevey
(74) *Attorney, Agent, or Firm* — Zilka-Kotab, P.C.

(57) ABSTRACT

A product includes a material having aluminum and at least one rare earth element (REE). The material includes the following microstructure features: at least 1 volume % particles of a phase of an aluminum-rare earth element alloy, the particles comprise at least 5 weight % of the at least one rare earth element, the particles have an average aspect ratio less than or equal to 5, and an average interparticle spacing between the particles is less than or equal to 1 μm. A method includes forming a base material, the base material having aluminum and at least one rare earth element (REE), and working the base material to form a product.

20 Claims, 10 Drawing Sheets

(56) References Cited

U.S. PATENT DOCUMENTS 6,149,737 A * 11/2000 Hattori .................. C22C 45/08
148/438
9,963,770 B2 5/2018 Rios et al.

OTHER PUBLICATIONS

U.S. Appl. No. 63/258,847, filed Jun. 1, 2021.
Sims et al., "Cerium-Based, Intermetallic-Strengthened Aluminum Casting Alloy: High-Volume Co-product Development," The Minerals, Metals & Materials Society, May 2016, 8 pages.
U.S. Appl. No. 17/803,369, filed May 24, 2022.
Zener et al., "Theory of Growth of Spherical Precipitates from Solid Solution," Journal of Applied Physics, vol. 20, 1949, pp. 950-953.

* cited by examiner

THERMOMECHANICALLY PROCESSED, NANOSTRUCTURE ALUMINUM-RARE EARTH ELEMENT ALLOYS

This invention was made with Government support under Contract No. DE-AC52-07NA27344 awarded by the United States Department of Energy. The Government has certain rights in the invention.

FIELD OF THE INVENTION

The present invention relates to structural alloys, and more particularly, this invention relates to thermomechanically processed, nanostructured aluminum-rare earth element alloys.

BACKGROUND

Complex parts for use at high temperatures are in high demand for applications such as heat exchangers, turbine blades, gas turbines, etc. Conventional alloys for these applications are less machinable and formable than typical steels and aluminum, and complicated parts are more difficult to produce and often require joining. The composition of these alloys often includes expensive constituents.

SUMMARY

Microstructural refinement improves strength and other properties in aluminum alloys. Generally, high solidification rates result in refined microstructural length scales. According to aspects of the present disclosure, aluminum alloyed heavily with rare earth elements (REE) include refined structures which are substantially resistant to thermal coarsening. Fine solidification structures can be further refined through thermomechanical processing. Al-REE-based alloys derived by bulk rapid solidification and subsequent thermomechanical processing as described herein address high structural performance with property retention at high temperatures.

A product, according to one general aspect, includes a material having aluminum and at least one rare earth element (REE). The material includes the following microstructure features: at least 1 volume % particles of a phase of an aluminum-rare earth element alloy, the particles comprise at least 5 weight % of the at least one rare earth element, the particles have an average aspect ratio less than or equal to 5, and an average interparticle spacing between the particles is less than or equal to 1 μm.

A method, according to another general aspect, includes forming a base material, the base material having aluminum and at least one rare earth element (REE), and working the base material to form a product.

Other aspects and advantages of the present invention will become apparent from the following detailed description, which, when taken in conjunction with the drawings, illustrate by way of example the principles of the invention.

DETAILED DESCRIPTION

Figure 1:
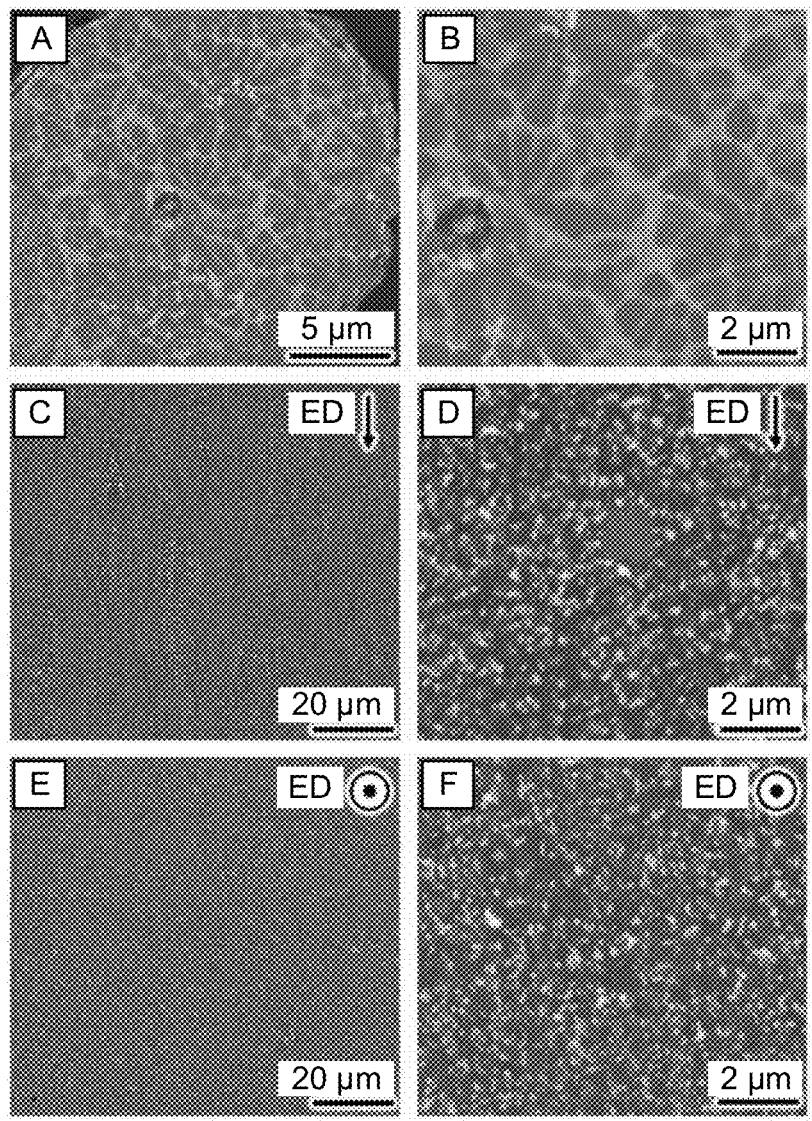
FIG. 1 depicts an exemplary product having the solidification microstructure of Al 8 wt. %, Ce 10 wt. %, Mg powder, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred aspects of aluminum-rare earth element alloys and/or related products and methods.

In one general aspect, a product includes a material having aluminum and at least one rare earth element (REE). The material includes the following microstructure features: at least 1 volume % particles of a phase of an aluminum-rare earth element alloy, the particles comprise at least 5 weight % of the at least one rare earth element, the particles have an average aspect ratio less than or equal to 5, and an average interparticle spacing between the particles is less than or equal to 1 μm.

In another general aspect, a method includes forming a base material, the base material having aluminum and at least one rare earth element (REE), and working the base material to form a product.

Conventional materials used for high temperature applications tend to be expensive, difficult to reliably form into products, and suffer from property degradation over time. For example, high temperature heat exchangers require a large number of manufacturing steps, complex designs, welding, etc. Microstructural refinement can improve strength and other properties of aluminum (Al) alloys. Generally, high solidification rates result in refined microstructural length scales and, in aluminum alloyed heavily with rare earth elements (REE) as described herein, these refined microstructures resist thermal coarsening. Coarsening as used in accordance with some aspects of the present disclosure may generally refer to the growth of microstructural features such as second phase particles or grain size from an initially small length scale to a larger length scale (e.g., 100 nm to 10 μm). According to various aspects of the present disclosure, Al-REE-based alloys derived by bulk rapid solidification and thermochemical processing are characterized as having beneficial properties and property retention at high temperatures compared to conventional aluminum alloys, particularly from about 200° C. to about 300° C. In stark contrast, conventional aluminum-based alloys are characterized has having relatively more atomic mobility of solute atoms, and coarsening throughout thermal cycling during processing and/or service. For instance, Al-Si-based alloy formed via rapid solidification may have an initially fine microstructural length scale, with second phase particles <200 nm in scale. Upon short (e.g., 1 hour) thermal exposure at >300° C. or extended (e.g., 100 hours or greater) thermal exposure at >200° C., the diffusivity of Si in Al enables particles to coarsen to >1 μm and the strength to decrease. Common alloys would decrease in strength by 20-50% after this exposure. Conversely, thermal exposure at this set of times and temperatures has little to no effect (e.g., 0-5% decrease in strength) on Al-REE alloys produced by rapid solidification with similar starting microstructures according to at least some of the aspects described herein.

Various aspects of the present disclosure include high performance alloys produced by rapid solidification and thermomechanical processing. In this instance, "rapid solidification" occurs when molten metal is cooled at >1000° C/s in the vicinity of solidification. Methods for rapid solidification include gas atomization, spray forming, selective laser melting additive manufacturing, melt spinning, etc. Materials produced by the processing route(s) described herein exhibit exceptional properties as compared to conventional Al alloys. For example, one instance of the material exhibited a yield strength of 670 MPa, on par with advanced precipitation-strengthened Al—Li-based alloys. Moreover, the nanoscale structures of the materials described herein are orders of magnitude more resistant to thermal coarsening (e.g., as represented by solute element diffusivity through the Al matrix phase) than conventional precipitation-strengthened Al—Li-based alloys due to the unique properties of the presently disclosed Al-REE alloys.

Rare earth elements as referred to herein may include scandium (Sc), yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

Al-REE alloys as presented herein may include at least one rare earth element, at least two rare earth elements, or any combination of rare earth elements including mischmetal. As used throughout the present disclosure, a "matrix" refers to the face centered cubic (FCC) crystalline Al phase that is the primary phase constituent of Al alloys.

Commonly cited metallic strengthening mechanisms include grain size strengthening, solid solution strengthening, dispersion strengthening, and work hardening. The primary effect of these mechanisms is to make dislocation motion (and thus the stress level at which the material permanently changes shape, e.g., yielding) more difficult. For grain size strengthening, as the grain size decreases, the strength tends to increase as the higher volumetric grain boundary area provides more barriers to dislocations. Solid solution strengthening occurs when elements in solution in FCC Al are either larger or smaller than Al. In either case, the tensile or compressive section of a dislocation core will energetically prefer to be located on the solute atom, creating an energy cost to moving off of the solute atom. Dispersion strengthening occurs when particles reside in the matrix and physically block dislocation motion. Dislocations may bypass a particle by forming a dislocation loop around it forming a longer dislocation line, or in some cases, a dislocation may sever the particle at the energetic cost of forming more of a particle/matrix interface. An extension of dispersion strengthening includes strain fields that some particles, such as semicoherent precipitates, can induce in the matrix, which also make dislocation motion more difficult. Work hardening is an increase in strength due to more dislocation interaction as dislocation density increases. Dislocation interactions generally extend dislocation line length or create new ones, further increasing the dislocation density and the magnitude of this mechanism in progressive fashion.

Thermomechanical processing produces wrought product by "working" the alloy, e.g., by extrusion, forging, rolling, cold spray, friction stir welding, etc. As used throughout the present disclosure, "working" and "thermomechanical processing" may be used interchangeably unless otherwise described herein. Working as a processing technique has a number of potential benefits including the ability to produce a desired shape, reducing casting porosity, breaking up uneven or coarse cast microstructure, work hardening the material, reducing grain size either dynamically during extrusion or by increasing dislocation density such that the material recrystallizes, etc. Conventional high strength wrought product is precipitation-strengthened and frequently the material is wrought in the solution treated condition. This is beneficial because the high dislocation density provides many nucleation sites for precipitates, making them finer and introducing more strengthening. Al alloys are conventionally thermomechanically processed starting with a bulk cast billet, blank, etc. Other conventional methods for thermomechanically processing Al alloys include using spray formed billets and consolidating powder into a monolithic piece of material through the process.

The four strengthening mechanisms described in detail above are extensively exploited in Al alloys. Dispersion strengthening is the most effective. Many Al alloy systems include solid state precipitation reactions which produce nanoscale precipitates with partial coherence in the matrix. The partial coherence and volume misfit induce large strain fields around the particles that dramatically strengthen the material. For example, in the 7000 alloy series, semicoherent $MgZn_2$ precipitates are mostly responsible for the improvement of strength from about 10 MPa for pure Al to greater than 500 MPa with the precipitates. The conventional framework by which these precipitates are formed in the alloys is a two stage heat treatment. The first step of the conventional framework includes a high temperature heat treatment (e.g., at about 450° C. to about 650° C.) which is performed on cast material to saturate the FCC matrix with solute and equilibrate solute distribution. The material is quenched to room temperature rapidly to hold solute in the matrix in a supersaturated solution. The second step of the conventional framework includes an aging treatment at lower temperature (e.g., about 150° C. to about 200° C.) to give just enough thermal activation to grow precipitates out of the supersaturated matrix in a controlled fashion.

Prior to the present disclosure, precipitation strengthening has been the most reliable way to produce high performance Al alloys but, above room temperature, the effect of precipitation strengthening is temporary. When the service temperature approaches or exceeds the aging temperature of an alloy, precipitates begin to coarsen and become incoherent with the matrix, thereby dramatically losing strengthening potency. The coarsening phenomenon is termed Ostwald Ripening, in which larger particles grow at the expense of smaller particles and depends in part on transport of solute through the matrix. In precipitation-strengthened alloys, Ostwald Ripening is particularly detrimental as the particles grow, the particles become more incoherent with the matrix, and the strengthening strain fields disappear. For the previously mentioned 7000 series alloys, this effect limits usable temperatures to around 100° C. and below. There is a subset of Al alloys that retain precipitation strengthening to moderate temperatures, including 2618 Al—Cu that is limited to around 200° C., 2055 Al—Li that is limited to around 250° C., and Al-Sc alloys which are usable up to 300° C. Al-Sc alloys rely on solute trapping of Sc during solidification (e.g., rather than a solution treatment), and subsequent high temperature aging at 300° C. The high aging temperature dictated by the low mobility of Sc makes the available service temperature correspondingly high. Sc is expensive and minor additions increase an alloy's cost tenfold. Coarsening limits active service temperatures and restricts the application flexibility because any strength that is lost is permanent in the application. There are industrial situations where thermal excursions above the normal service can occur, and depending on the severity, this could weaken the material such that is fails at the normal service temperature due to persistent weakening.

With the dominance of precipitation strengthened alloys, Al—Ce alloys (and similarly for Al-REE alloys) as described herein offer a different approach to strengthening than conventional alloys. One distinguishing feature of Al—Ce alloys is the near-zero solubility of Ce in the Al FCC matrix phase, the Al—Ce having an estimated 0.0005 wt. % max solid solubility. For comparison, Si has 1.65 wt. % max solubility. Ce also forms very stable (e.g., melting at high temperature and with slow internal diffusion) binary Al—Ce intermetallic and ternary Al—Ce—X intermetallic phases with many common Al alloying elements like Si and Cu. This combination makes thermal coarsening of Al—Ce based phases extremely difficult and slow. While the driving force for ripening exists, the inability of Ce to diffuse through the matrix results in "islands" of Ce-containing phases. These islands can change morphology and even composition, but cannot substantially grow in ways that depend on Ce transport through the FCC matrix. The Al—Ce phase diagram features a eutectic reaction at about 11 wt. % Ce and 635° C.

Depending on solidification rate, a hypoeutectic alloy in the system solidifies through a dendritic/cellular process, through a dendritic/eutectic process, through a divorced eutectic, etc.

The features of Al—Ce alloys make them of interest for high temperature applications, but they also make the conventional heat treatments unavailable, at least for Ce-containing phases. For example, once the alloy solidifies, the Ce-containing phases cannot be solutionized or coarsened substantially, making the solidification microstructure morphology and scale extremely important for all future configurations of a particular piece of Al—Ce alloy. Heat treatment will not affect microstructure substantially. Working the material affects the microstructure substantially. For instance, in a binary alloy near the eutectic composition (11 wt. % Ce), material solidified under standard permanent mold conditions (about 1 C/sec to about 10 C/sec) consist of eutectic colonies of layered $Al_{11}Ce_3$ and FCC Al laths around 1 μm thick and 10 μm wide. Extruding this microstructure to a substantial degree (e.g., an extrusion ratio greater than around 5:1) causes the brittle $Al_{11}Ce_3$ intermetallic laths to break up into particles around the minimum dimension of the prior lath.

Contrasting with standard precipitation-strengthened alloys, worked Al—Ce alloys exploit conventional strengthening mechanisms discussed in detail above. For example, for grain size strengthening, during working, a material undergoes dynamic recrystallization or increases dislocation density such that the material easily recrystallizes on subsequent heat treatment. Insoluble Al—Ce particles act to halt the growth of these grains by the Zener drag mechanism, potentially at sizes near the interparticle spacing. Depending on the starting microstructure, this distance may be less than 100 nm, resulting in an extremely small (and strengthening) grain size similar to this distance. Conventional alloy grain sizes after solutionizing heat treatment are usually between about 10 μm to about 200 μm. For solid solution strengthening, under normal conditions, Ce does not contribute meaningful solid solution strengthening. Mg is a particularly potent solid solution strengthener in Al and does not react with Ce under most circumstances, leaving it available to strengthen the Al FCC matrix. For dispersion strengthening, if starting with a fine lamellar or cellular structure, brittle Al—Ce intermetallics are easily broken into smaller, low aspect ratio particles during working. Incoherent particles above 1 μm are generally not considered to impart much strength directly by interaction with dislocations, but below 100 nm strength contribution by dislocation looping can be substantial. These length scales are achievable by rapid solidification and working of Al—Ce alloys, according to the various aspects described herein. Because they are incoherent, the particles do not have the strengthening potency of conventional semicoherent precipitates as in the 7000 series. However, the volume fraction of Al—Ce-based particles may be much higher than the about 1 vol. % for conventional alloys. The volume fraction of Al—Ce-based particles may be greater than or equal to 10 vol. %. For work hardening, working the material imparts significant strength, increasing dislocation density and providing a driving force for recrystallization. Depending on the reduction and degree to which the material recrystallizes, the increase in yield strength is substantial. Work hardening does not typically increase ultimate tensile strength and reduces ductility. Additionally, for particle stimulated nucleation, during working, especially rolling and extrusion, materials develop a preferred grain orientation (e.g., texture) based on the active slip systems and associated grain rotation.

Grains tend to recrystallize with texture close to that of the parent grains, but near particles, nuclei of more diverse texture can begin to grow due to local accumulated deformation. The foregoing particle stimulated nucleation is not a strengthening mechanism per se, but improves plasticity performance.

In preferred aspects, fine microstructure features are present in the starting material. "Fine" microstructures as referred to throughout the present disclosure may refer to second phase particles which have at least one dimension which is less than 500 nm, less 100 nm, less than 50 nm, etc. In various aspects, "fine" microstructural features may refer to a grain size having at least one dimension which is less than 2 μm, less than 500 nm, less than 100 nm, etc. The fine microstructures may be obtained through rapid solidification via any desirable technique that would become apparent to one skilled in the art upon reading the present disclosure. Examples of techniques that provide rapid solidification include powder atomization, laser melting, spray forming, melt spinning, etc. In some small form factors, conventional approaches may be used produce suitably fine microstructures, in a manner known in the art. Once solidified, the material can be worked to break up the particles and initiate the full range of strengthening mechanisms as discussed above.

FIG. 1 depicts an exemplary product including the microstructure of gas atomized AlCeMg powder and a solid piece of alloy produced by powder consolidation of said powder, in accordance with one aspect. The product shown in FIG. 1 shows the microstructure of gas atomized Al 8 wt. %, Ce 10 wt. %, Mg powder. The power was placed in a 2.5 inch diameter aluminum can and extruded through a 0.5 inch diameter die, resulting in an extrusion ratio of 25:1. The powder has a nanoscale architecture based on the cooling rate, and the extrusion breaks up the laths to form a fine dispersion of discrete particles, visible in both the longitudinal and transverse planes.

FIG. 1 shows the microstructure of a produced alloy before and after extrusion powder consolidation. The micrographs shown in FIG. 1 were collected using a Scanning Electron Microscope (SEM) in backscatter mode. This gives Z contrast, so bright regions have a higher average atomic number than darker regions. For this material, bright regions are Al—Ce-based intermetallics and the darker regions are Al face centered cubic (FCC) matrix phase. Portion (A) and portion (B) of FIG. 1 depict the internal microstructure of gas-atomized powder and the microstructure of the powder after consolidation at 25:1 ratio, respectively. Portion (C) and portion (D) of FIG. 1 depict a view perpendicular to the extrusion direction (ED). Portion (E) and portion (F) of FIG. 1 depict a view parallel to the extrusion direction (ED). During extrusion, the fine solidification microstructure of the powder is broken into fine, discrete particles at the scale of the prior lath thickness. Some particle stringing is visible in portion (C) of FIG. 1, including a legacy of individual laths that broke up and dispersed along the extrusion direction (ED). At high magnification, the material has a fine dispersion of ~100 nm particles.

The inventors have found the strength of the alloy produced by this method to be above or equal to 650 MPa, approaching the maximum possible strength in conventional Al alloys (e.g., about 700 to about 800 MPa). The Al-REE alloys also have thermal resistance far in excess of high-strength conventional alloys. For example, Al-REE alloys as described herein are characterized as having up to three times the mechanical properties of the base materials in a process which is production capable (e.g., scalable), where said process would become apparent to one having ordinary skill in the art upon reading the present disclosure.

Al-REE alloys as described herein take advantage of the low solubility of aluminum to produce materials having the strength characteristics of metal matrix composites, without the use of reinforcement mechanisms. The Al-REE alloys as described herein are characterized as demonstrating the grain boundary halting behavior by non-coarsening particles as seen in conventional metal matrix composites and nano-composites. Notably, while the presently disclosed materials may bear many similarities to metal matrix composites in terms of structure and properties, the presently disclosed materials are not composites. The materials presented herein are distinct from composites where the Al-REE alloys include insoluble particles which are characteristic of the thermodynamics and phase equilibria of the alloy itself, rather than something that is added separately (e.g., as in metal matrix composites).

Figure 2:
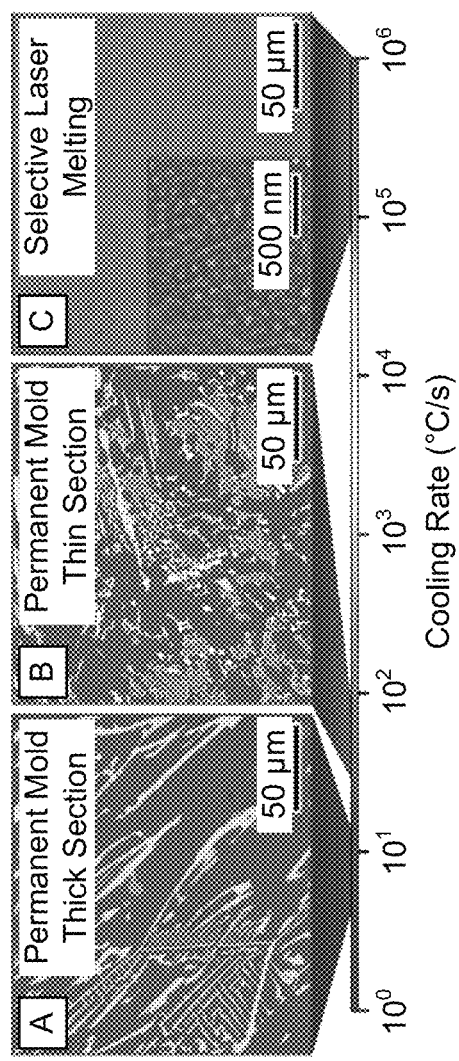
FIG. 2 depicts the effect of cooling rate on microstructural scale and morphology of an Al 8 wt. %, Ce 10 wt. %, Mg alloy, in accordance with one aspect of the present invention.
Figure 3:
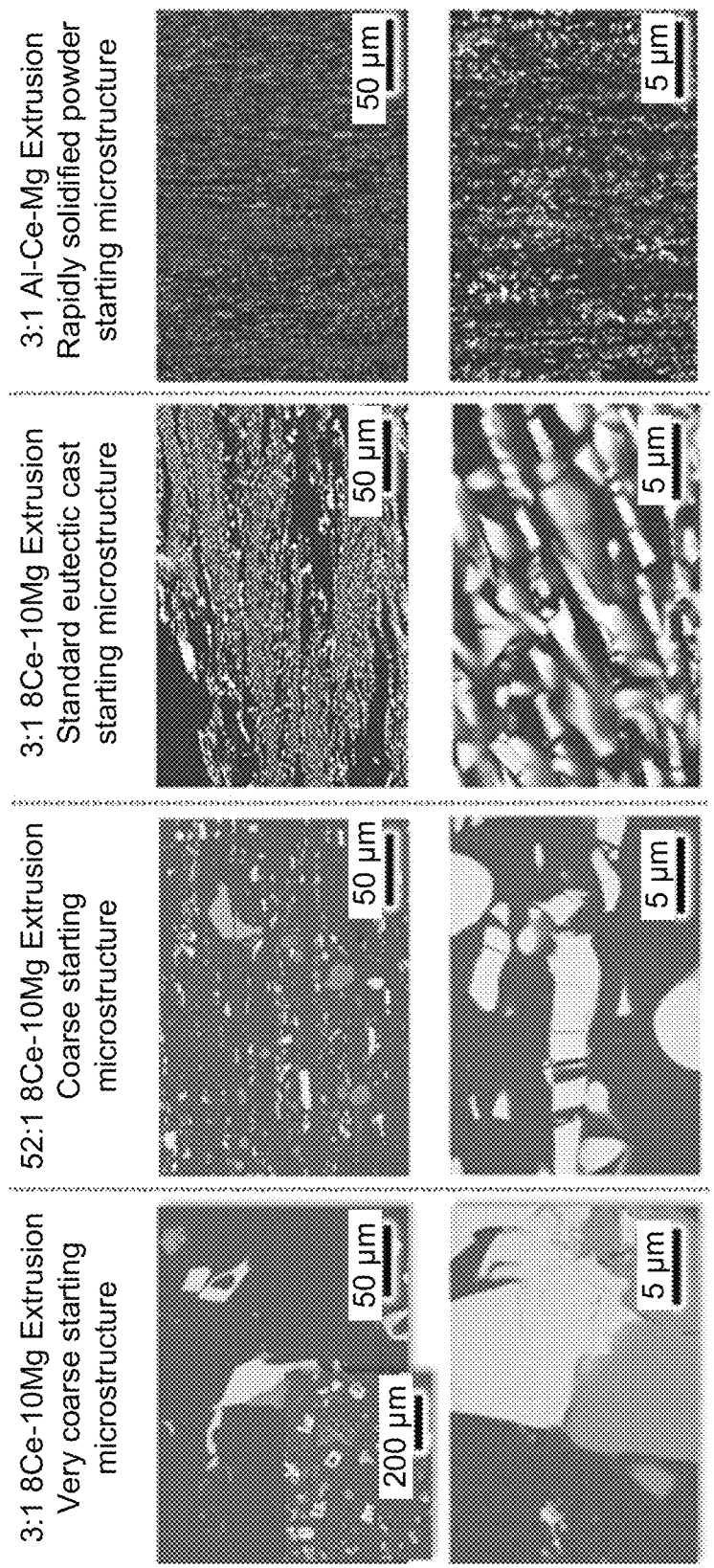
FIG. 3 depicts the influence of starting microstructure on the microstructure of extruded products for an Al 8 wt. %, Ce 10 wt. %, Mg alloy, in accordance with one aspect of the present invention.

The difference in microstructure development between conventional and rapid solidification conditions can be significant. FIG. 2 shows the microstructures of an Al 8 wt. %, Ce 10 wt. % Mg alloy in: a permanent mold thick section with cooling rate 6-12 K/s; a permanent mold thin section with cooling rate 40-60 K/s; and the alloy produced by selective laser melting (SLM) with a cooling rate of $10^5$-$10^6$ K/s. Solidification in a permanent mold (e.g., as shown in portions (A) and (B)) results in a dendritic structure with fishbone-type eutectic colonies containing Al—Ce intermetallics. Rapid solidification by SLM results in microstructures which are so fine that higher magnification is required, revealing a change in solidification mechanism resulting in well-dispersed nanoscale intermetallic particles. Portion (C) of FIG. 2 reveals that the solidification mechanism has shifted from dendritic+eutectic in permanent mold to cellular dendritic in SLM, resulting in a fine dispersion of nanoscale intermetallic particles. This microstructural scale is retained after thermomechanical processing, shown in FIG. 3. Here, the same alloy (e.g., the Al 8 wt. %, Ce 10 wt. %, Mg alloy) solidified under different conditions has been extruded and the final microstructures are shown. From left to right, the starting microstructure is finer, resulting in a finer particle dispersion after extrusion. Extrusion can break up intermetallic laths, but the general scale is limited by lath thickness. Thus, a material with initially fine microstructure like powder results in a much finer particle dispersion in the final product.

Figure 4:
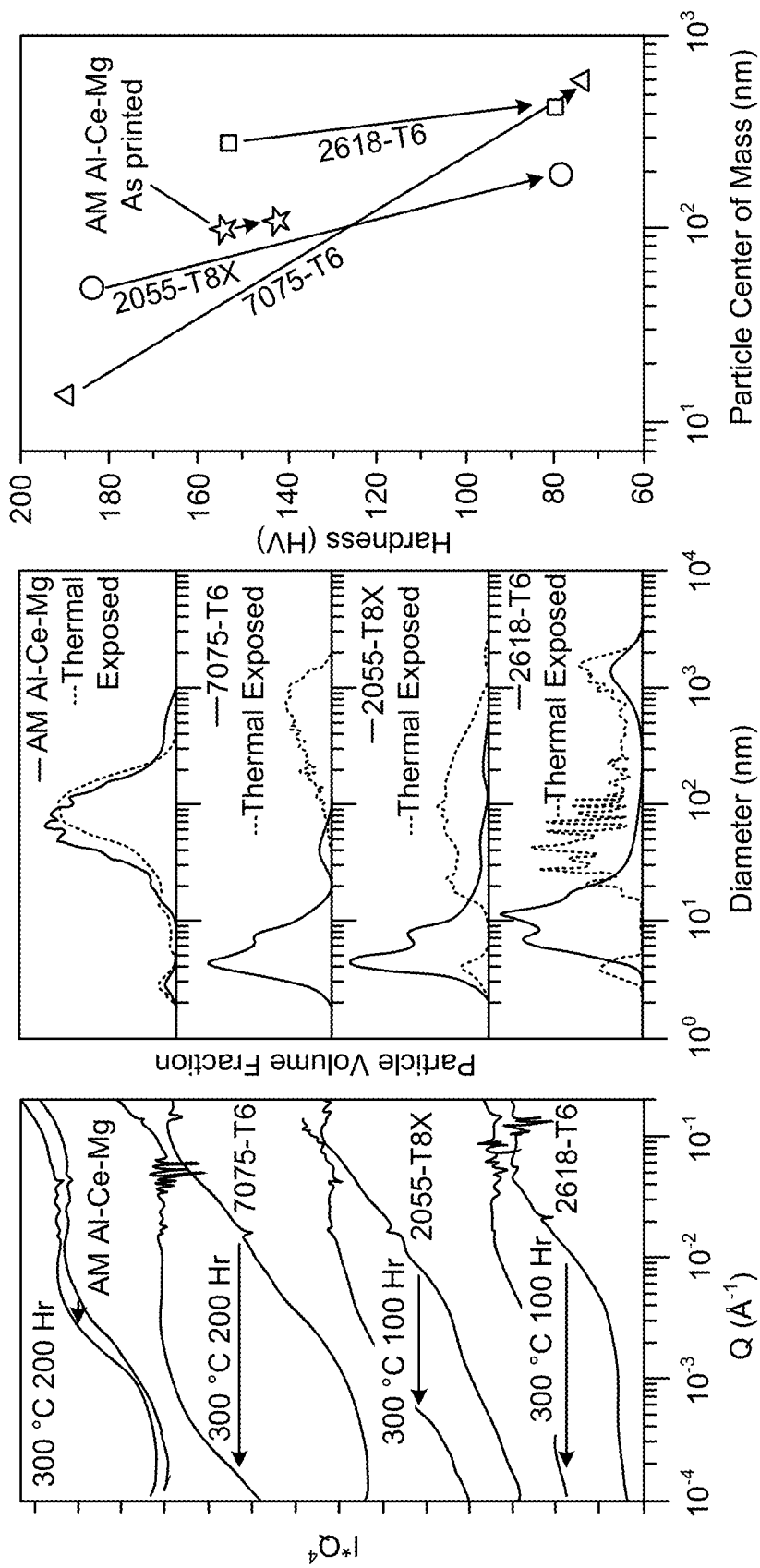
FIG. 4A is a small angle X-ray scattering (SAXS) Porod plot for AM Al—Ce—Mg and conventionally optimized alloys before and after extended thermal exposure at 300° C., in accordance with one aspect of the present invention.
FIG. 4B is a spherical model of the data in FIG. 4A, in accordance with one aspect of the present invention.
FIG. 4C depicts the correlation between coarsening, described by the volumetric average particle size, and changes in microhardness that occur during thermal exposure, in accordance with one aspect of the present invention.

Formation of nanoscale structures during rapid solidification is common to many alloys, but the distinguishing feature of Al—Ce alloys and other insoluble alloy systems is how that structure resists coarsening at high temperature. Small angle X-ray scattering (SAXS) is a powerful technique able to detect changes in microstructural scale within ~5 nm to ~5 μm. Resistance to thermal coarsening of Al—Ce—Mg fabricated by selective laser melting (SLM) additive manufacturing and technologically mature extruded Al alloys 7075-T6, 2618-T6, and 2055-T8X is assessed in FIGS. 4A-4C, where samples before and after 300° C. thermal exposure for each alloy are compared. The three commercial alloys, among the highest-performance available, rely on solid-state precipitation reactions for their high strength. In the Porod plot in FIG. 4A, a non-zero slope reflects microstructural features at the corresponding length scale (~2π/q). As such, shifts to the left after thermal exposure (note the reciprocal axis) reflect microstructural coarsening. All three commercial alloys, even Al alloys 2055 and 2618 that are specifically designed for high temperature application, exhibit substantial thermal coarsening after 100-200 hours of exposure at 300 C. However, the curves for SLM Al—Ce—Mg before and after thermal exposure show minimal difference, reflecting the degree of coarsening. The curves are offset for clarity. The area between the curves corresponds to the degree of coarsening of the nanoscale constituents in the structure. This is exhibited more clearly in FIG. 4B, in which the scattering data are deconvoluted to a particle size distribution (PSD), assuming individual spherical particles. FIG. 4B is a spherical model of the data in FIG. 4A, showing how thermal exposure changes the particle size distribution (PSD). The conventional alloys coarsen during thermal exposure, while the PSD for additively manufactured (AM) Al—Ce—Mg remains nearly unchanged. After thermal exposure at 300° C., the PSD of the conventional alloys coarsens by at least an order of magnitude. In contrast, the scale of particles in SLM Al—Ce—Mg did not change appreciably after 200 hours at 300° C.; though evolution of morphology was detectable. The low mobility of Ce through FCC Al restricts the growth of particles through Ostwald ripening, while no such mechanism restrained coarsening in the commercial alloys.

Microstructural coarsening is correlated to microhardness in FIG. 4C as a parametric plot of PSD center of mass (FIG. 4B) against Vickers hardness before and after heat treatment. The hardness of the SLM Al—Ce—Mg alloy changes minimally, mirroring the microstructural stability. The three conventional alloys experienced substantial strength degradation after exposure at 300° C., from 40% to 60%. Hardness decreases by 8% in AM Al—Ce—Mg compared to 40% to 60% in conventional alloys. Other factors such as grain growth and dislocation recovery likely contribute to this strength reduction, but the loss of strengthening precipitates in the 10-100 nm size range correlates strongly with a loss in mechanical properties that would render these alloys non-viable in strength-critical applications.

Figure 5:
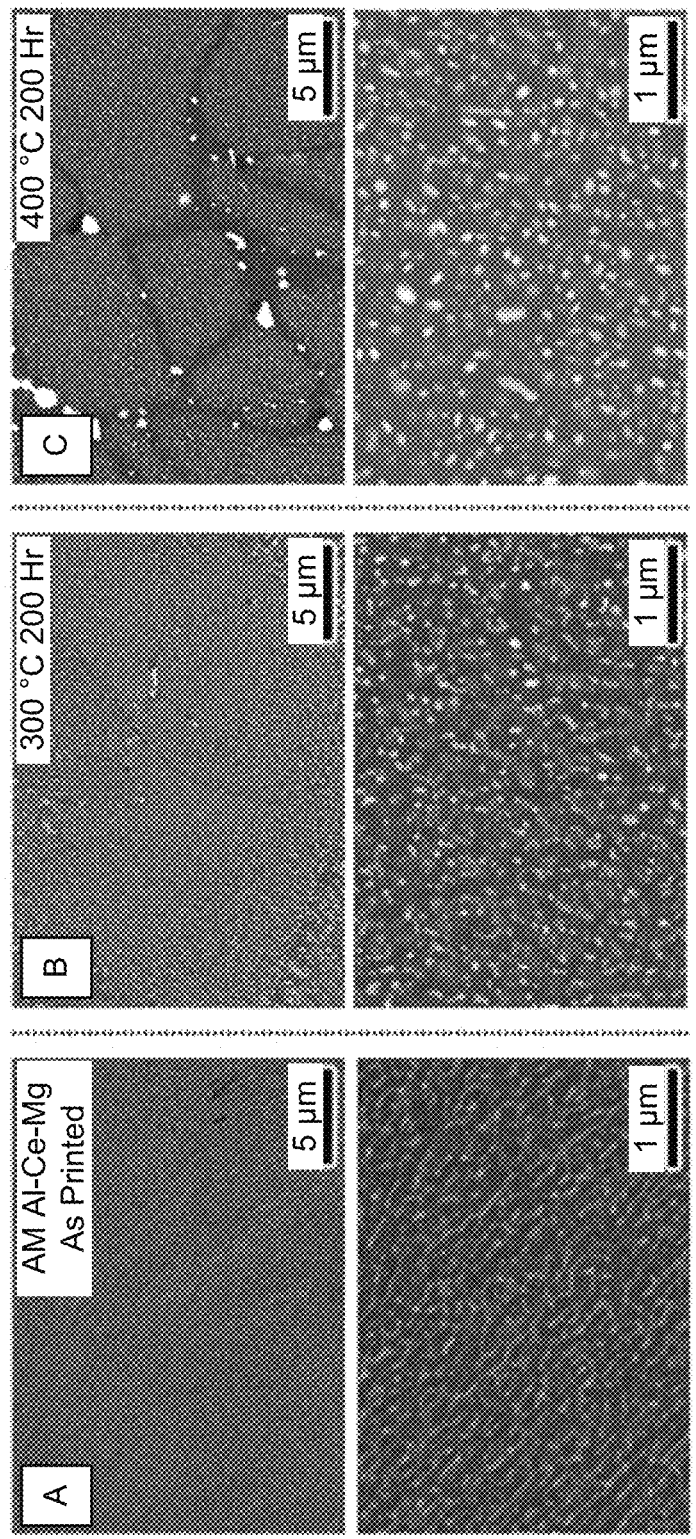
FIG. 5 includes scanning electron microscope (SEM) images of the microstructure of SLM Al—Ce—Mg as printed and after prolonged thermal exposure at 300° C. and 400° C., in accordance with one aspect of the present invention.

The microstructural evolution of SLM Al—Ce—Mg during thermal annealing is shown in portions (A)-(C) of FIG. 5, which shows SEM images of the microstructure for the as-printed, 300° C. thermal exposure, and 400° C. thermal exposure conditions. Only particle morphology changes are seen at 300° C., while some coarsening and grain boundary diffusion are evident at 400° C. The as-printed condition shows a network of partially connected Ce-containing particles, formed by a cellular/dendritic reaction from the rapid solidification conditions. Qualitatively, minimal coarsening is evident after thermal exposure at 300° C., reflecting the SAXS results. However, the particle morphology changes, with the plate-like intercellular particles becoming more spherical. It appears that almost no Ce diffusion through the FCC matrix occurs in the sample annealed at 300° C., but there is enough thermal activation for self-diffusion within the intermetallic particles and the FCC matrix to reduce energy by decreasing interfacial density. At 400° C., Ce grain boundary diffusion is active, with larger intermetallic particles growing at grain boundary triple points and a denuded zone appearing along grain boundaries. Particles within grains also show a modest degree of coarsening. The grain boundary denuded zone is much thicker than the interparticle spacing within grains. One potential explanation for this is that Ce diffuses along grain boundaries to triple points at 400° C., alleviating particle pinning and allowing grain boundary motion. After a small amount of motion, the boundary intersects more Al—Ce-based particles and grain boundary diffusion begins again.

Figure 6:
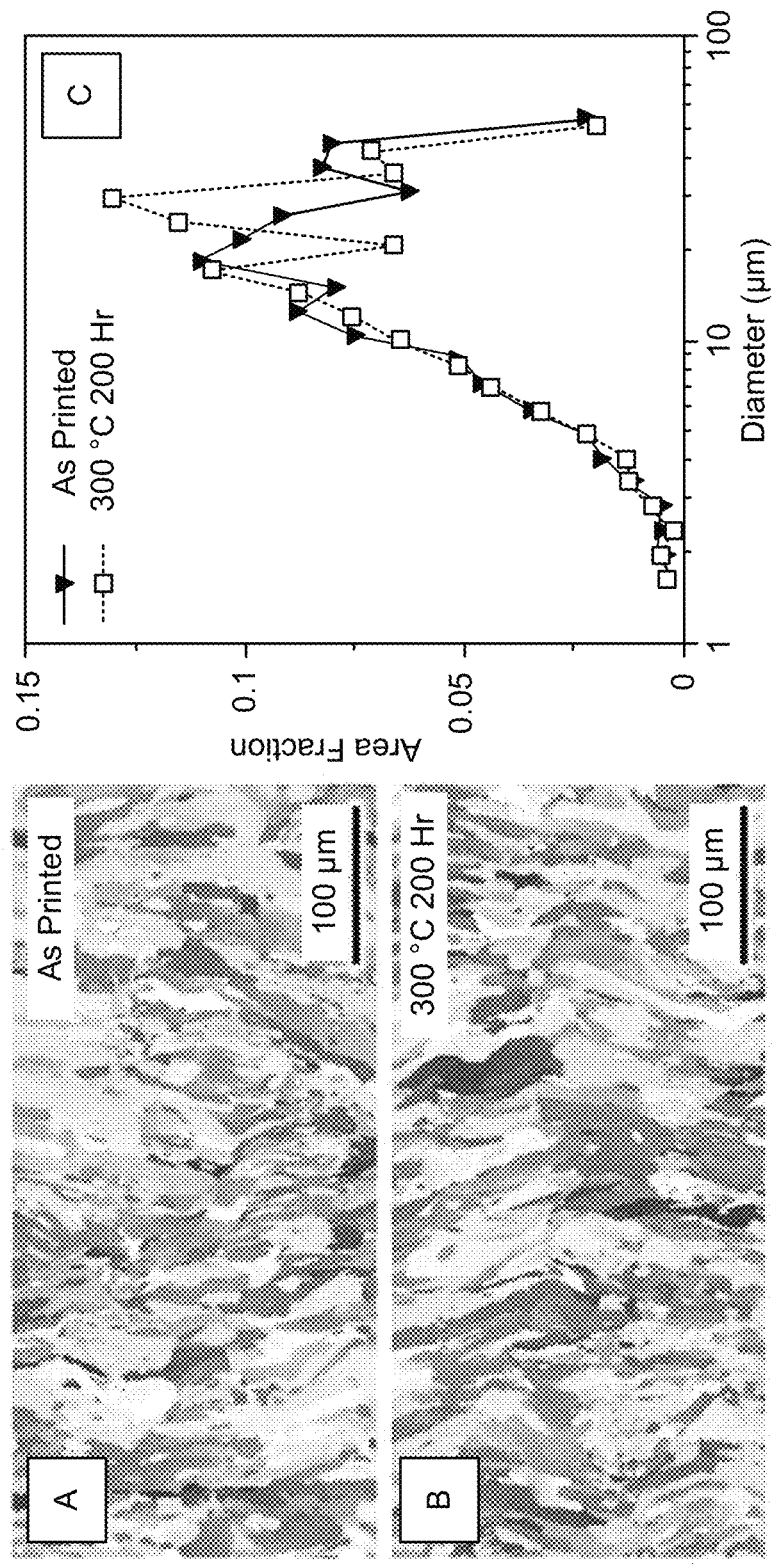
FIG. 6 depicts the grain size change with thermal exposure, in accordance with one aspect of the present invention.

One factor that can contribute to strength retention at elevated temperature is the restriction of grain growth. The classic description is by Zener in which particles reduce grain boundary energy by reducing total grain boundary area when they interact. (Zener, C. Theory of Growth of Spherical Precipitates from Solid Solution. Journal of Applied Physics 20, 950-953 (1949)). Electron backscatter diffraction (EBSD) was used to measure grain size distribution of the Al FCC phase and its change with thermal exposure in the sample built on a heated (170° C.) build plate, the results of which are shown in FIG. 6. Inverse pole figures reveal the columnar grains formed during solidification (solidification upward) with no discernable change observed after thermal exposure at 300° C. This is shown quantitatively in portion (B) of FIG. 6 where grain size distribution of the two conditions is compared. The near zero change in grain size distribution below 10 µm indicates that no significant grain growth has occurred in the sample. Indeed, close inspection of portion (C) of FIG. 6 suggests that grain boundaries have not meaningfully moved from their as-printed locations even at 400° C., otherwise the denuded zones would not be localized. As stated before, the presence of the denuded zone suggests some grain boundary motion at 400° C., but on a much longer timescale than typical in Al alloys. The ability to arrest grain growth is likely to be an important design feature of these alloys. While the as-printed grain size in the current materials is not small enough to account for the degree of strengthening in the alloy, these results suggest that higher strength and similar strength retention may be possible if smaller initial grain size can be achieved by altering solidification conditions (such as introducing inoculants or altering the growth mode) or inducing deformation and recrystallizing.

The particle volume fraction of the product may be determined by the alloy element content (including the REE(s), etc.) and by the solidification conditions. Different solidification rates can result in different particle chemistry and volume fraction. For example, Al alloys which contain Ce may have a minimum particle content dictated by the Ce content. A product formed according to at least some of the approaches described herein includes microstructure features comprising greater than or equal to 1 vol. % particles intrinsic to the alloy, greater than or equal to 5 vol. % particles intrinsic to the alloy, greater than or equal to 10 vol. % particles intrinsic to the alloy, etc. In various preferred approaches, the product includes greater than or equal to 2 vol. % particles intrinsic to the alloy. In various other preferred approaches, the product includes greater than or equal to 3 vol. % particles intrinsic to the alloy.

In preferred aspects, a product formed according to at least some of the approaches described herein includes microstructure features comprising at least 1 vol. % particles intrinsic to the alloy. These particles preferably have at least 5 wt. % Ce (or other REE(s)). These particles have an average aspect ratio less than 5, in various approaches. The average interparticle spacing between the particles is less than or equal about to about 2 µm. In preferred aspects, the average interparticle spacing between the particles is less than or equal about to about 200 µm.

In other preferred aspects, a product formed according to at least some of the approaches described herein includes a composition having Ce in a range between about 4 and about 20 wt. %.

While much of the present description discusses Al—Ce as the primary example, it is to be understood that similar results are expected for alloys of Al with other REEs. Thus, an REE other than Ce, and any combination of REEs, are considered as substantially isomorphic with Ce, and such REE and/or REE combinations may be used with and/or in place of Ce in any of the various alloys described herein. For example, Al-REE alloys may include La, Nd, Pr, mischmetal, etc., or any combination thereof. Thus, the mention of Ce, and/or use of any particular Ce wt. % herein can be considered as referring to pure Ce, a different pure REE such as La or Nd, or an admixture of two or more REE that combines to the stated value at any ratio.

Natural mischmetal comprises, in terms of weight percent, about 50% cerium, 30% lanthanum, with the balance being other rare earth elements. Thus, modification of Al alloys with cerium through addition of mischmetal may be a less expensive alternative to pure cerium.

In addition to the development of two component Al—Ce alloys, adding REE components to other aluminum-based alloys, such as Al-alloys containing chromium, niobium, and molybdenum, improves the desirable properties of such super alloys, and expands the alloys' application space.

Following are several exemplary Al-REE alloys, as well as Al-REE alloys that include one or more additional alloying elements. Additions of the following alloying elements (in weight %) are included using the Al—Ce eutectic point as a base and improving mechanical properties with solid-solution strengthening and the formation of carbides, the gamma prime phase, the gamma double prime phase, and others.

With Al as the balance, an Al-REE alloy may have a composition of magnesium (Mg), copper (Cu), manganese (Mn) and/or nickel (Ni) in a weight % in a range of greater than 0 weight % to about 15 weight %. With Al as the balance, a material comprising an Al-REE alloy may have a composition of silicon (Si) in a weight % in a range of greater than 0 weight % to about 25 weight %. With Al as the balance, a material comprising an Al-REE alloy may have a composition of zinc (Zn) in a weight % in a range of greater than 0 weight % to about 75 weight %. With Al as the balance, an Al-REE alloy may have a composition of zirconium (Zr), scandium (Sc), titanium (Ti) and/or chromium (Cr) in a weight % in a range of greater than 0 weight % to about 2 weight %. With Al as the balance, an Al-REE alloy may have a composition of iron (Fe), lithium (Li), and/or silver (Ag) in a weight % in a range of greater than 0 weight % to about 5 weight %.

These compositions are exemplary and one having ordinary skill in the art would appreciate that a material comprising aluminum and a rare earth element may comprise at least one rare earth element, at least two rare earth elements, or any combination of rare earth elements according to various approaches disclosed herein. Al-REE alloys may include at least one rare earth element, at least two rare earth elements, or any combination of rare earth elements according to various approaches described herein. In various approaches, a material comprises aluminum and a plurality of rare earth elements. In other approaches, a material may comprise aluminum, at least one rare earth element, and at least one additional element described herein.

Figure 7:
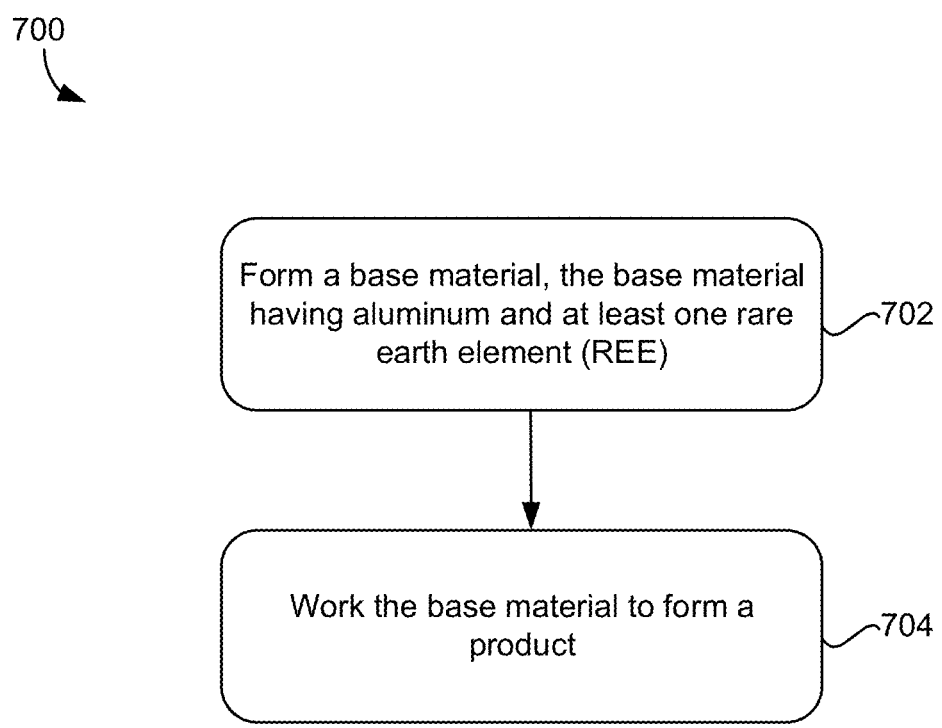
FIG. 7 is a flowchart of a method, in accordance with one aspect of the present invention.

FIG. 7 is a flowchart of a method 700, in accordance with one aspect. As an option, the present method 700 may be implemented to construct structures, devices, assemblies, etc., such as those shown in the other FIGS. described herein. Of course, however, this method 700 and others presented herein may be used to form structures for a wide variety of devices and/or purposes which may or may not be related to the illustrative aspects listed herein. Further, the methods presented herein may be carried out in any desired environment. Moreover, more or less steps than those shown in FIG. 7 may be included in method 700, according to various aspects. It should also be noted that any of the aforementioned features may be used in any of the aspects described in accordance with the various methods.

Method 700 includes step 702. Step 702 includes forming a base material, the base material having aluminum and at least one rare earth element (REE). In various approaches, forming the base material includes a rapid solidification process. The rapid solidification process may include gas atomization, plasma atomization, ultrasonic atomization, powder atomization, laser melting, spray forming, melt spinning, etc.

In preferred aspects, the at least one rare earth element includes cerium (Ce). In other approaches, the at least one rare earth element may include scandium (Sc), yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). In yet other approaches, the at least one rare earth element includes mischmetal. In at least some aspects, the base material may comprise at least two rare earth elements, at least three rare earth elements, etc.

In at least some approaches, the at least one rare earth element is present in a weight percentage of the material in a range of about 4% to about 20%. In various approaches, the base material is characterized as having an aspect ratio of greater than or equal to 5.

Step 704 includes working the base material to form a product, such as an alloy as described herein in any form, a final product, a component for use in a final product, etc. In various approaches, working the base material to form a product includes rolling, forging, extrusion, friction stir welding, cold spray, and ball milling, etc.

The product is preferably characterized as having at least 1 volume % particles of a phase of an aluminum earth element alloy. The particles comprise at least 5 weight % of the at least one rare earth element, in at least some aspects. In various approaches, the product is characterized as having an aspect ratio of less than or equal to 5. The product may be characterized as having microstructural features having an average interparticle spacing between the foregoing particles which is less than or equal to 1 µm. In various aspects, the internal particle size dispersion includes at least 80% of internal particle volume fraction being dispersed from about 5 nm to about 200 nm.

In preferred aspects, the microstructure features remain substantially unchanged and/or resist coarsening after exposure to temperatures in a range of between about 200° C. and about 300° C. for 1 hour.

Various approaches include forming the material comprising aluminum and at least one rare earth element. When selecting the rare earth element, one having ordinary skill in the art may consider the solubility of the rare earth element in the aluminum for the intended application, where the solubility improves the production of intermetallics which add strength to the material. For example, in various approaches, Mg, Cu, Mn, and/or Ni may be selected for the Al-REE alloy for various electric vehicle battery applications and/or subsystems, internal engine components, low density (e.g., lower than the density of steel, 7.8 g/cm$^3$) reciprocating components, pistons, hard coatings, brake rotors, cylinder heads, suspension components, etc. "Hard coatings" may refer to coating having parameters which would be determinable by one having ordinary skill in the art, in view of the intended application. In various aspects, "hard coatings" as used herein may refer to coatings which prevent wear of various types to an underlying structure which is relatively more susceptible to wear. In further exemplary approaches, Mg and/or Zn may be selected for the Al-REE alloy for various solid solution strengthening applications. In yet further exemplary applications, at least some of the compositions listed herein may be suitable for precipitation strengthening applications.

In various approaches, a product comprises an Al-REE alloy where the alloy is a binary alloy. In other approaches, a product comprises an Al-REE alloy where the alloy is a ternary alloy. For example, an exemplary product may comprise Al, Ce, and at least one additional rare earth element, at least two rare earth elements, at least one additional element, at least two additional elements, etc.

In at least some approaches, composite additions including $TiB_2$, SiC, $Al_2O_3$, etc., may be added prior to solidification, or after solidification and before thermomechanical processing, for providing additional benefit after working. Composite reinforcement can alter material behavior in a number of beneficial ways, including increasing strength, altering coefficient of thermal expansion or elastic modulus, altering solidification microstructure, etc. In these approaches, the composite attributes would be in addition to the base alloy features.

In various approaches, the Al-REE materials are produced in a two-step process: 1) a rapid solidification step to form feedstock materials having any of the compositions described above and 2) a working processing step to disperse and further refine the initial structure to form the final Al-REE materials. The rapid solidification and/or working steps may include various techniques known in the art. Rapid solidification techniques include gas atomization, plasma atomization, ultrasonic atomization, melt spinning, spray forming, and laser melting, etc. Thermomechanical processing (e.g., working) steps include cold spray, powder consolidation by extrusion, rolling, ball milling, etc.

The inventors believe that the presently presented combination of working of rapidly solidified Al-REE-based alloys results in formation of microstructure features with properties not previously achievable. Individual droplets of the atomized power are able to solidify extremely quickly, thereby resulting in the nanostructured lattice of intermetallics (e.g., within the formed feedstock powder). Upon thermomechanically processing these materials, the Al-REE alloys develop substantially increased strength properties.

The Al-REE alloys described herein are characterized as having substantial thermal resistance. For example, the Al-REE alloys described herein are characterized as having stable microstructures which remain substantially unchanged after relatively long exposure to relatively high temperatures. Furthermore, the Al-REE alloy materials are characterized by microstructures which are resistant to thermal coarsening. In one exemplary aspect, the Al-REE alloys described herein are characterized as having microstructures which remain substantially unchanged and/or resist coarsening after exposure to temperatures in a range of between about 200° C. and about 300° C., where the exposure is between 1 hour and 10 hours. The inventors were surprised that the Al-REE alloys maintained the microstructures where conventional gas atomized materials lose these microstructures upon processing.

In various aspects of the present disclosure, the feedstock materials (e.g., the materials formed from the rapid solidification step, prior to working) are similarly characterized as having microstructure features which resist coarsening after exposure to temperatures in a range of between about 300° C. and about 400° C., where the exposure is between 1 hour and 10 hours.

In preferred aspects, the microstructure of the feedstock material is directly related to the microstructure of a consolidated part comprising the feedstock material (e.g., powder). The inventors were surprised that the powders and the consolidated materials both maintained these similar properties and structures. Further, the inventors were surprised that the properties and structures were substantially maintained even when the temperature was varied during the consolidation process (e.g., a temperature change of 100° C., 200° C., and 300° C.). In conventional materials, the microstructure is deformed, or otherwise destroyed, upon further processing (e.g., such as working processes). In some aspects, the microstructure of the powder is substantially maintained from the powder form factor to the consolidated product comprising the Al-REE alloys. Furthermore, the microstructure of the powder may be improved from the powder form factor to the consolidated product where the microstructure is further refined through the working processing.

In various aspects, the Al-REE alloys comprise a range of particle sizes in the range of 5 nm to 300 nm. In other aspects, the range of particle sizes is between about 5 nm and about 200 nm. In various aspects, second phase structure following rapid solidification comprise a range of particle sizes less than or equal to 500 nm, less than or equal to 200 nm, less than or equal to 100 nm, etc. In various aspects, the resulting particles following the working step comprise a range of particle sizes between about 5 nm to about 500 nm. In other aspects, the resulting particles following the working step comprise a range of particle sizes between about 5 nm to about 200 nm. In yet other aspects, the resulting particles following the working step comprise a range of particle sizes between about 5 nm to about 100 nm.

In preferred aspects, Al-REE alloys as described herein are characterized as having plastic deformation properties for refining the microstructures. For example, the microstructure may be refined by breaking up the relatively brittle intermetallics to form nanoparticles. In preferred aspects, the Al-REE alloys are characterized as having greater than or equal to potential 10% tensile elongation. For example, the microstructural modification achieved in an atomization process is an order of magnitude reduction in microstructure size. In various approaches, the cooling rate for at least some of the processing steps described herein is at least $10^4$ C/sec.

In at least some approaches, the material comprising aluminum and at least one rare earth element (e.g., formed by at least some aspects of the rapid solidification and thermomechanical processing steps described herein) may be deposited as a coating. The material may be used in bond coating applications, in at least one aspect, for improved adhesion to oxides and/or as a thermal barrier coating.

In some aspects, the material comprising aluminum and at least one rare earth element (e.g., formed by at least some aspects of the rapid solidification and thermomechanical processing steps described herein) may be deposited onto a substrate.

The substrate may be flexible or rigid, depending on the intended application. The substrate may be part of the final component for which the material is used. In other approaches, the substrate may be sacrificial, and the material removed therefrom before use in any of various intended applications.

Experimental Data

Figure 8:
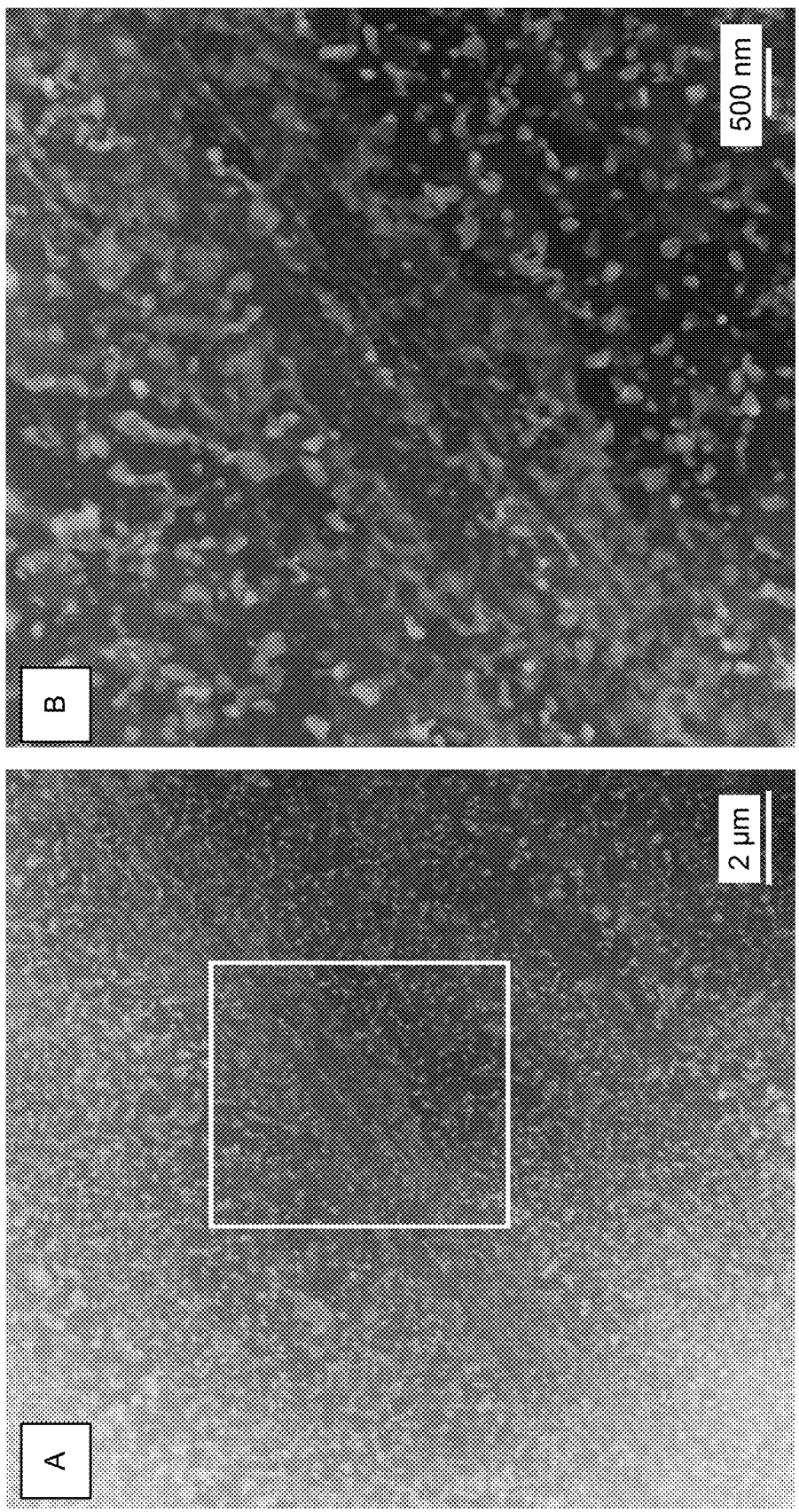
FIG. 8 depicts the structure of an Al 8 wt. %, Ce 10 wt. %, Mg powder extrusion, in accordance with one aspect of the present invention.
Figure 9:
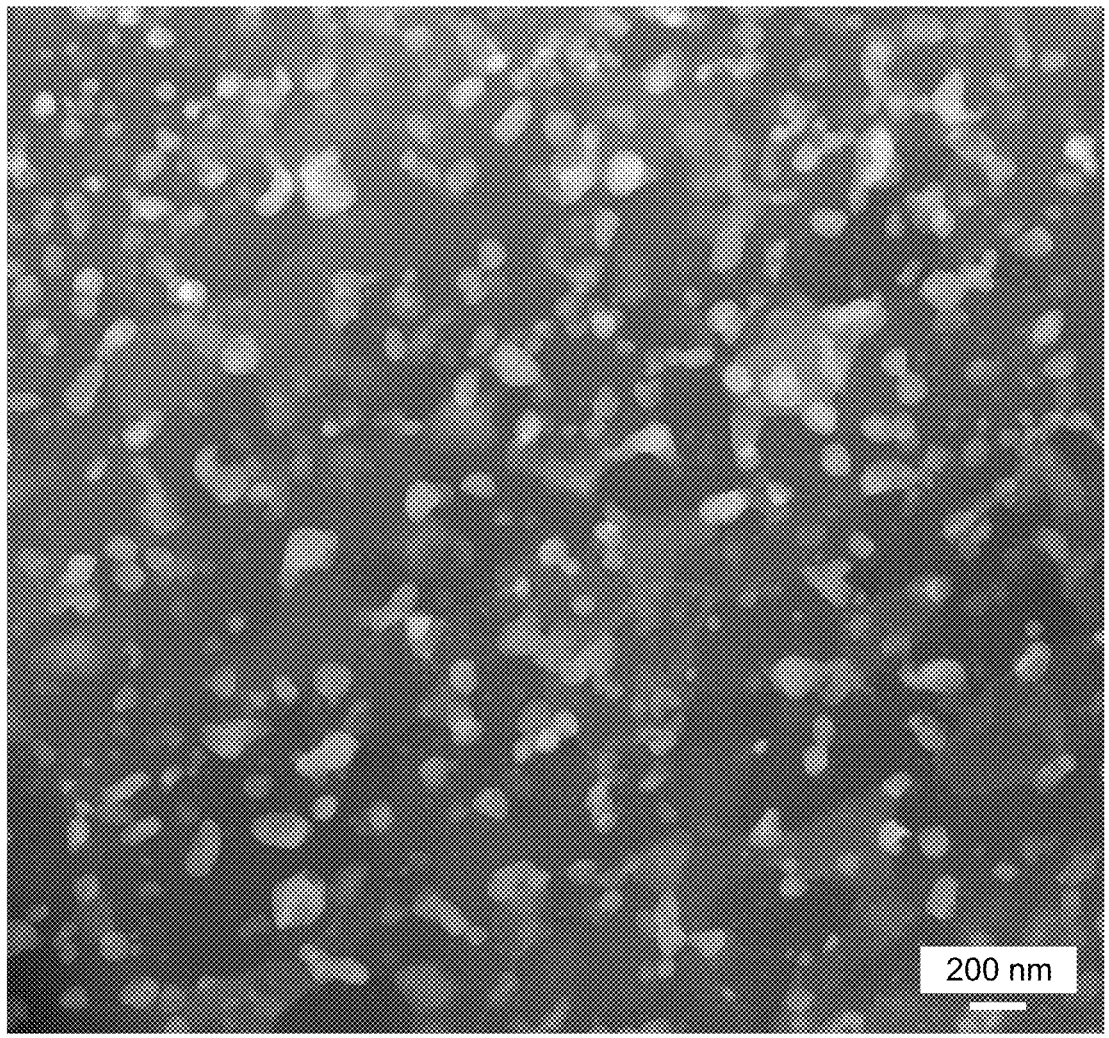
FIG. 9 depicts the structure of an Al 8 wt. %, Ce 10 wt. %, Mg powder extrusion, in accordance with one aspect of the present invention.
Figure 10:
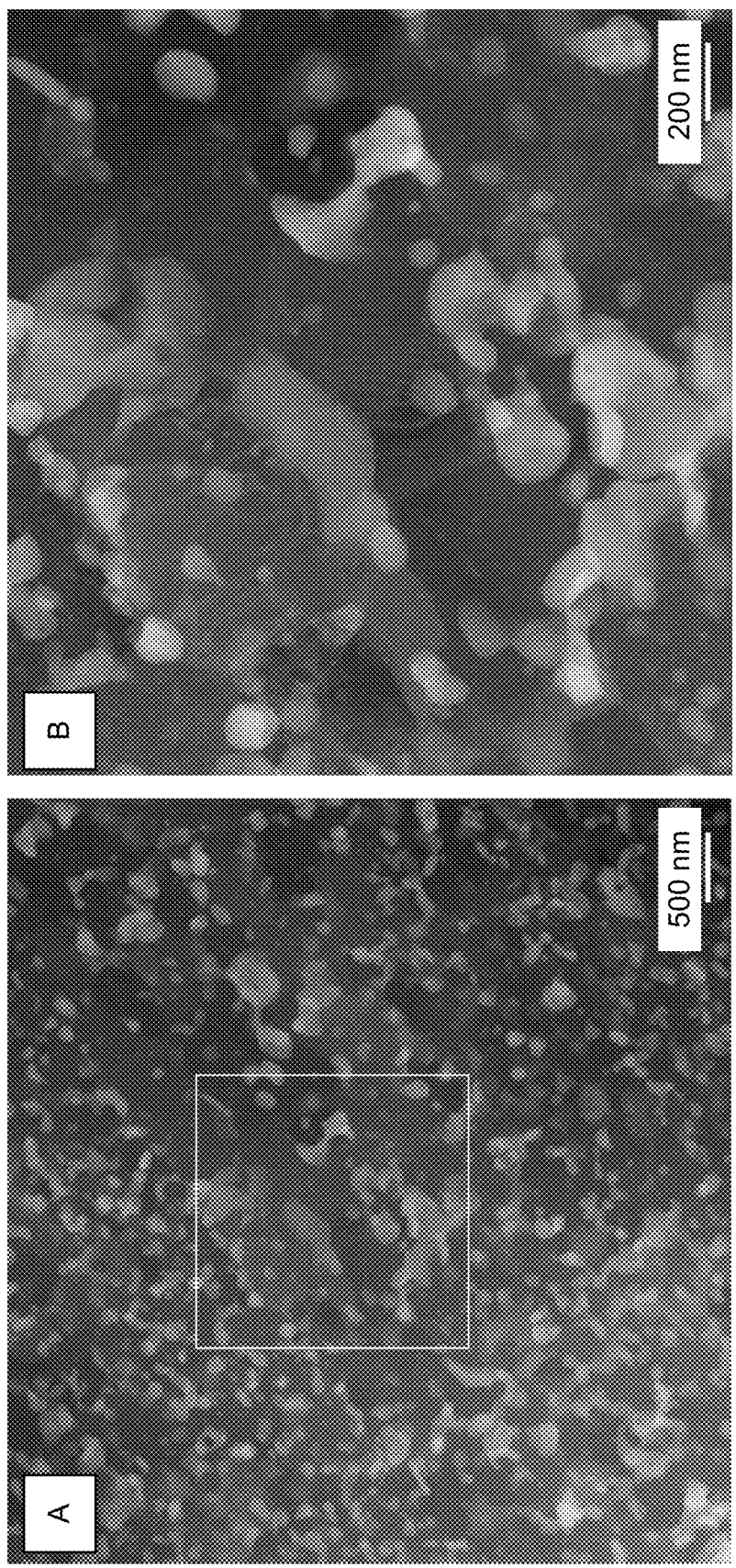
FIG. 10 depicts the structure of an Al 8 wt. %, Ce 10 wt. %, Mg powder extrusion, in accordance with one aspect of the present invention.

FIGS. 8-10 depicts the structure of an Al 8 wt. %, Ce 10 wt. %, Mg powder extrusion in the as-extruded condition with transmission electron microscopy high angle annular dark field (TEM-HAADF). Average atomic number is the primary contrast mechanism in the imaging mode, so Ce-rich regions (intermetallics) appear bright. FIG. 8 shows the microstructure with particle stringing evidenced along the extrusion direction from lower left to upper right. Some FCC Al grains can be visualized by contrast in FIG. 9, and the general grain size appears to be between about 300 nm and about 500 nm. Higher magnification of the structure in FIG. 10 reveals a highly polydisperse Ce-rich particle dispersion (e.g., from about 5 nm to about 200 nm) characteristic of materials described herein. Some networks of dislocations are evident in the center of FIG. 10 portion (B).

Uses

Al-REE alloys as described herein are of high interest for high temperature transportation applications and reciprocating components. Turbocharger cold side impellers, for instance, may operate above 2000° C. for long periods of time and have significant mechanical requirements. High strength and high temperature extruded Al alloys as described herein are of particular interest for turbocharger applications.

At least some aspects of the Al-REE alloys described herein represent property extremes for strength and temperature resistance. These Al-REE alloys may be configured for use in internal combustion engines (e.g., pistons, rods, etc.), aerospace (e.g., jet engine components, leading edge structures, heat resistant spacecraft components, etc.), and defense applications.

Al-REE alloys may be configured for use in commercially in transportation, electricity, generation, industrial sectors, and/or wherever there is a need for high temperature functionality and pressure resistance. The Al-REE alloys presented herein may be used in current and future high temperature and high pressure applications in the aerospace and power generation industries.

Additional high temperature applications for the Al-REE alloys presented herein include turbine blades in gas turbine components, turbocharger components, combustion chamber components, exhaust system components, control surfaces, reaction vessel components, power generation components, steam turbine components, diverter components, diverse nozzle components, solar thermal collection components, high temperature wiring, etc.

The Al-REE alloys as described herein have similar properties as metal matrix composites and metal matrix nanocomposites without having any of the processing and quality control challenges associated with metal matrix composites and metal matrix nanocomposites. Accordingly, the Al-REE alloys as described herein may be used as a replacement material in many applications which conventionally use metal matrix composites and metal matrix nanocomposites.

In various aspects, the Al-REE alloys as described herein may be used in applications which conventionally use titanium such as turbo fans, engines, aircraft, etc. Titanium is relatively more difficult to machine and manufacture, thereby substantially increasing the time and expense of producing titanium components. Al-REE alloys as described herein may be usable as a replacement material for titanium in at least these cases.

The inventive concepts disclosed herein have been presented by way of example to illustrate the myriad features thereof in a plurality of illustrative scenarios, aspects, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. A product, comprising:
a material having aluminum and at least one rare earth element (REE),
the material having the following microstructure features:
at least 1 volume % particles of a phase of an aluminum-rare earth element alloy,
wherein the particles comprise at least 5 weight % of the at least one rare earth element,
wherein the particles have an average aspect ratio less than or equal to 5, and
wherein at least 20% by volume of the particles of the aluminum-rare earth element alloy have a particle size above 100 nm.

2. The product of claim 1, wherein the at least one rare earth element includes cerium (Ce).

3. The product of claim 1, wherein the at least one rare earth element is selected from the group consisting of: scandium (Sc), yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

4. The product of claim 1, wherein the at least one rare earth element includes mischmetal.

5. The product of claim 1, wherein the at least one rare earth element is present in a weight percentage of the material in a range of about 4% to about 20%.

6. The product of claim 1, wherein the material comprises at least two rare earth elements.

7. The product of claim 1, wherein the material comprises at least one additional element, wherein the at least one additional element is selected from the group consisting of: magnesium (Mg), copper (Cu), manganese (Mn), and nickel (Ni), wherein the at least one additional element is present in a weight percentage of the material in a range of greater than 0% to about 15%.

8. The product of claim 7, wherein the material is configured for use in an application selected from the group consisting of: an electric vehicle battery, an internal engine component, a reciprocating component, a piston, a brake rotor, a cylinder head, and a suspension component.

9. The product of claim 1, wherein the material comprises silicon (Si) present in a weight percentage of the material in a range of greater than 0% to about 25%.

10. The product of claim 1, wherein the material comprises zinc (Zn) present in a weight percentage of the material in a range of greater than 0% to about 75%.

11. The product of claim 1, wherein the material comprises at least one additional element selected from the group consisting of: zirconium (Zr), scandium (Sc), titanium (Ti), and chromium (Cr), wherein the at least one additional element is present in a weight percentage of the material in a range of greater than 0% to about 2%.

12. The product of claim 1, wherein the material comprises at least one additional element selected from the group consisting of: iron (Fe), lithium (Li), and silver (Ag), wherein the at least one additional element is present in a weight percentage of the material in a range of greater than 0% to about 5%.

13. The product of claim 1, wherein the microstructure features are characterized as having about 80% of an internal particle volume fraction thereof having an internal particle size dispersion in a range from about 5 nm to about 200 nm.

14. A method, comprising:
forming the material having aluminum and at least one rare earth element (REE) as recited in claim 1; and
working the material to form the product.

15. The product of claim 1, wherein the material consists of the aluminum and the at least one rare earth element.

16. The product of claim 1, wherein the at least one rare earth element is present in a weight percentage of the material in a range of greater than 8% to less than 18%.

17. The product of claim 1, wherein the material comprises magnesium (Mg) present in a weight percentage of the material in a range of greater than 0% to about 15%.
a material having aluminum and at least one rare earth element (REE),
the material having the following microstructure features:
at least 1 volume % particles of a phase of an aluminum-rare earth element alloy,
wherein the particles comprise at least 5 weight % of the at least one rare earth element,
wherein the particles have an average aspect ratio less than or equal to 5,
wherein an average interparticle spacing between the particles is less than or equal to 1 μm, and
wherein at least 20% by volume of the particles of the aluminum-rare earth element alloy have a particle size above 100 nm.

18. A product, comprising:
a material having aluminum and at least one rare earth element (REE),
the material having the following microstructure features:
at least 1 volume % particles of a phase of an aluminum-rare earth element alloy,
wherein the particles comprise at least 5 weight % of the at least one rare earth element,
wherein an average interparticle spacing between the particles is less than or equal to 1 μm, and
wherein at least 20% by volume of the particles of the aluminum-rare earth element alloy have a particle size above 100 nm.

19. A product, comprising:
a material having aluminum and at least one rare earth element (REE),
the material having the following microstructure features:
at least 1 volume % particles of a phase of an aluminum-rare earth element alloy,
wherein the particles comprise at least 5 weight % of the at least one rare earth element,
wherein an average interparticle spacing between the particles is less than or equal to 1 μm, and
wherein at least 20% by volume of the particles of the aluminum-rare earth element alloy have a particle size above 100 nm.

20. The product of claim 18, comprising an object selected from the group consisting of: an electric vehicle battery, an internal engine component, a reciprocating component, a piston, a brake rotor, a cylinder head, and a suspension component; at least a portion of the object being formed of the material.

\* \* \* \* \*